United States Patent [19]

Tanoshima et al.

[11] Patent Number: 4,890,230

[45] Date of Patent: Dec. 26, 1989

[54] ELECTRONIC DICTIONARY

[75] Inventors: Katsuhide Tanoshima; Hikoshi Nagasawa, both of Tokyo, Japan

[73] Assignee: Electric Industry Co., Ltd., Tokyo, Japan

[21] Appl. No.: 135,525

[22] Filed: Dec. 17, 1987

[30] Foreign Application Priority Data

Dec. 19, 1986 [JP] Japan .................................. 61-301760
Jan. 19, 1987 [JP] Japan .................................... 62-8069
Jan. 19, 1987 [JP] Japan .................................... 62-8070
Feb. 13, 1987 [JP] Japan ................................... 62-29884

[51] Int. Cl.$^4$ .......................... G06F 15/38; G06K 9/22
[52] U.S. Cl. ....................................... 364/419; 382/59; 235/472
[58] Field of Search ..................... 364/419, 709; 382/1, 382/11, 59; 235/472, 432

[56] References Cited

U.S. PATENT DOCUMENTS

| | | | |
|---|---|---|---|
| 3,114,980 | 12/1963 | Davis | 382/1 |
| 4,028,537 | 6/1977 | Snow | 235/472 |
| 4,377,741 | 3/1983 | Brekka et al. | 235/432 |
| 4,392,053 | 7/1983 | Bockholt | 235/472 |
| 4,393,460 | 7/1983 | Masuzawa et al. | 364/900 |
| 4,393,462 | 7/1983 | Tanimoto et al. | 364/900 |
| 4,439,836 | 3/1984 | Yoshida | 364/900 |
| 4,574,317 | 3/1986 | Scheible | 235/432 |
| 4,589,143 | 5/1986 | Baur et al. | 235/432 |
| 4,724,523 | 2/1988 | Kucera | 364/419 |
| 4,727,245 | 2/1988 | Dobbins et al. | 235/472 |

FOREIGN PATENT DOCUMENTS 0053974 9/1982 Japan .

OTHER PUBLICATIONS

Uberbacher, "Read/Write Stylus", *IBM Tech. Disclosure Bulletin*, vol. 19, No. 1, Jun. 1976, pp. 177–178.
*Pat. Abs. of Japan*, 56-50463, Miyake, Abs. Pub. Date Jul. 11, 1981 (p070).
*Pat. Abs. of Japan*, 56-71164, Tsukimura, Abs. Pub. Date Aug. 26, 1981 (p077).
*Pat. Abs. of Japan*, 57-10876, Komiya, Abs. Pub. Date May 6, 1982 (p113).
*Pat. Abs. of Japan*, 57-147735, Komiya, Abs. Pub. Date Dec. 10, 1982 (p161).
*Pat. Abs. of Japan*, 59-35279, Ikegami, Abs. Pub. Date Jun. 20, 1984 (p281).
*Pat. Abs. of Japan*, 59-206985, Itou, Abs. Pub. Date Apr. 5, 1985 (p346).
*Pat. Abs. of Japan*, 60-20285, Kunisawa, Abs. Pub. Date Jun. 15, 1985 (p364).
*Pat. Abs. of Japan*, 60-247785, Kageyama, Abs. Pub. Date may 6, 1986 (p453).
*Pat. Abs. of Japan*, 61-82275, Tanabe, Abs. Pub. Date Sep. 2, 1986 (p493).
*Pat. Abs. of Japan*, 61-283972, Komatsu, Abs. Pub. Date May 14, 1987 (p575).

*Primary Examiner*—Jerry Smith
*Assistant Examiner*—David M. Huntley
*Attorney, Agent, or Firm*—Spencer & Frank

[57] ABSTRACT

An electronic dictionary for electronic translation of words or compound words in a source language to the corresponding words or compound words in a target language comprises an optical reader which optically reads the source language to be translated, and a translation unit which produces, on the basis of the data output from the optical reader, output of a target language corresponding to the source language.

12 Claims, 15 Drawing Sheets

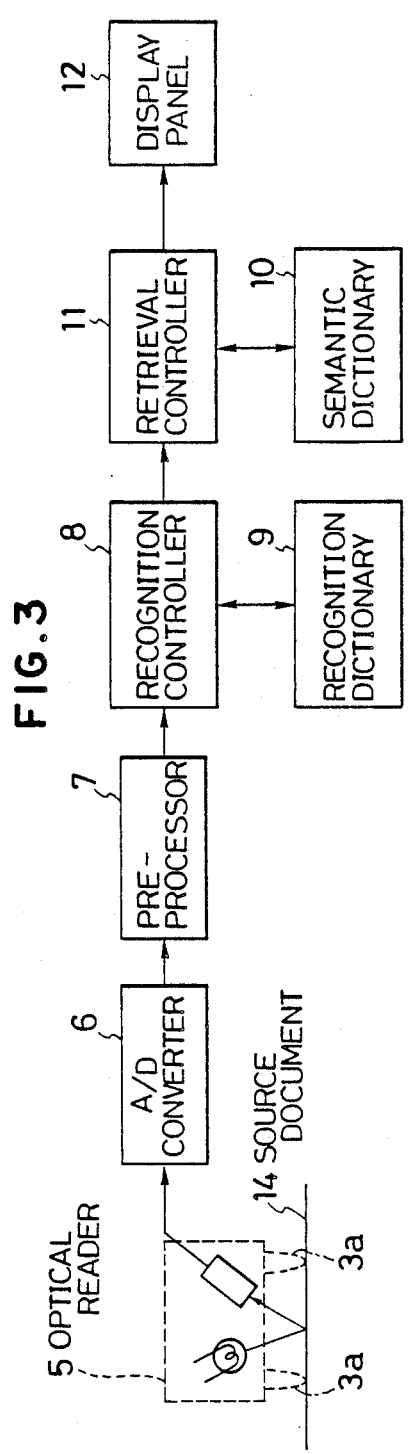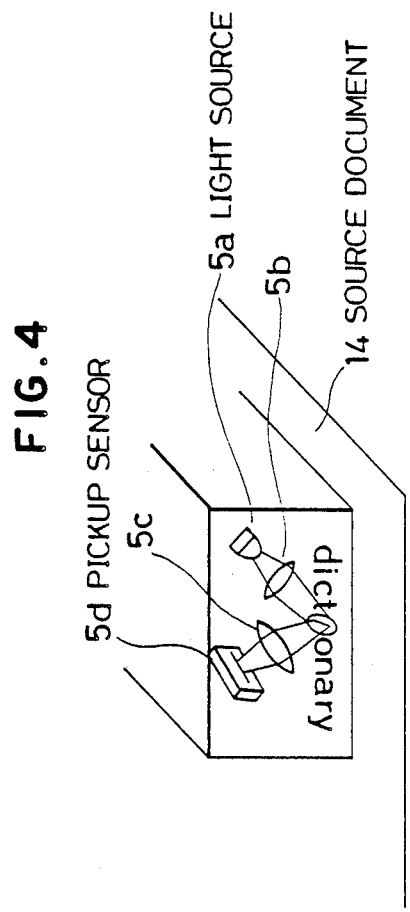

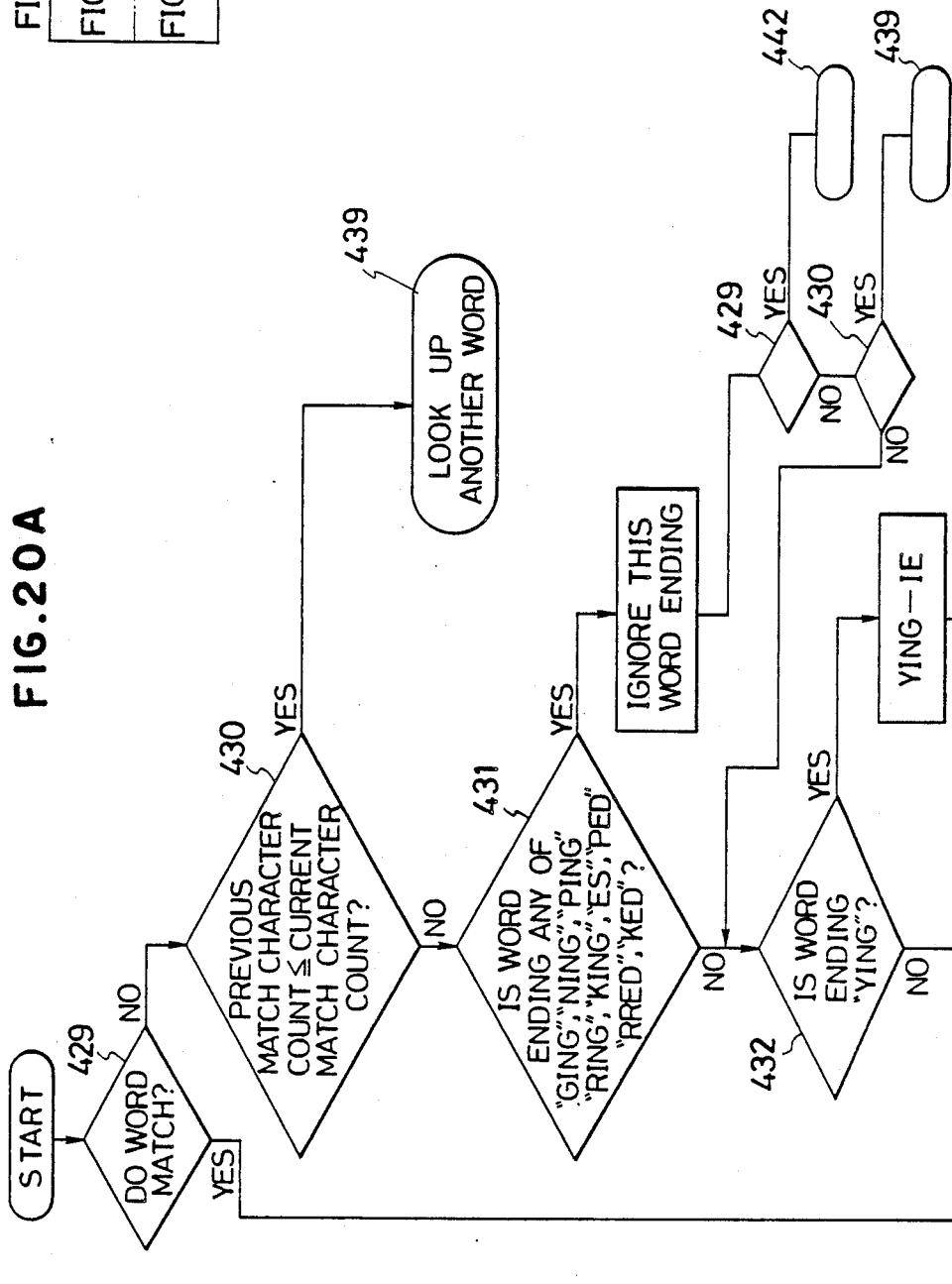

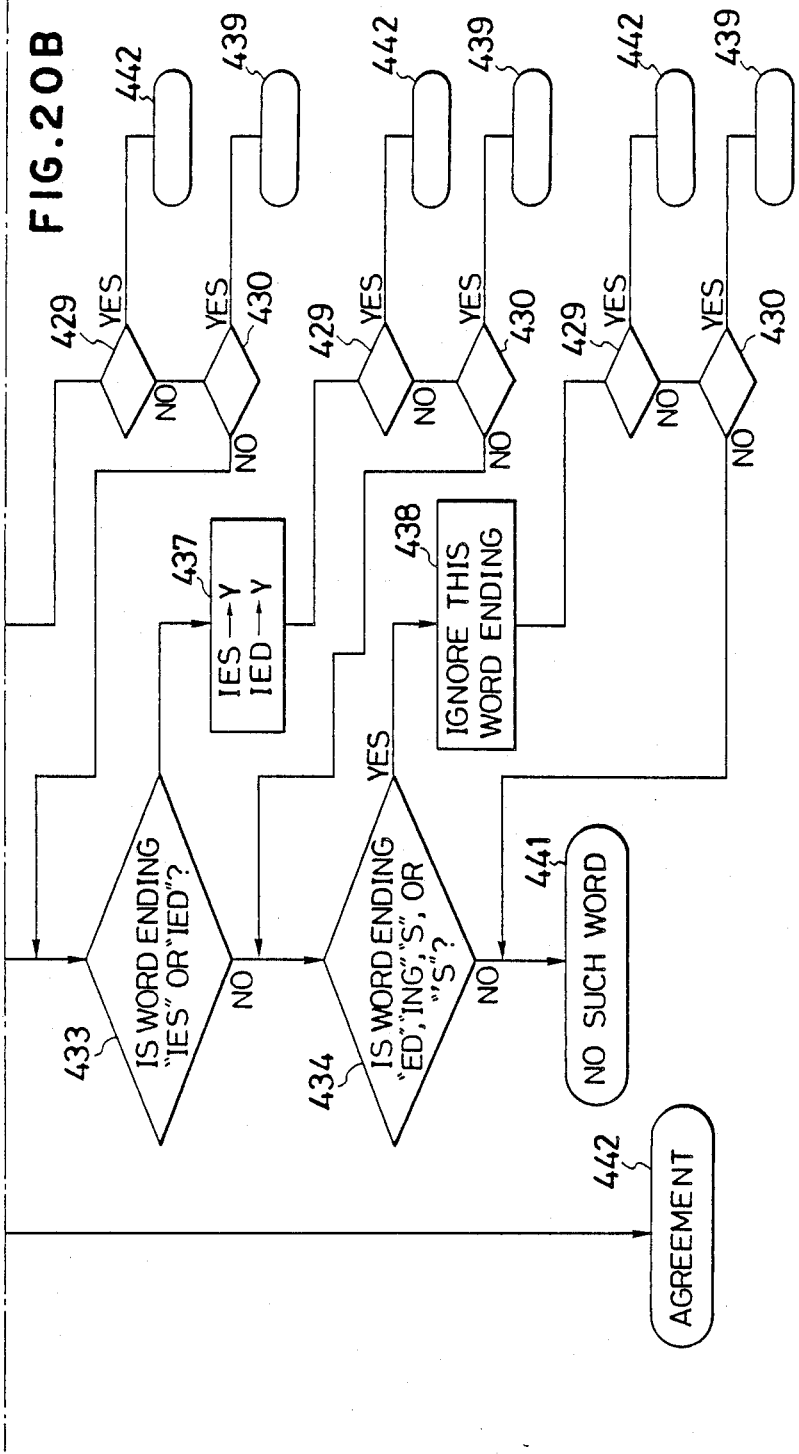

ELECTRONIC DICTIONARY

BACKGROUND OF THE INVENTION

This invention concerns an electronic dictionary for the electrical translation of words or compound words from one language (source language) into words or compound words of another language (target language); in particular, it concerns the means of input into the electronic dictionary of the words or compound words to be translated.

So-called electronic dictionaries have been commercially available. Such electronic dictionaries require keyboard input, for example, of English words or compound words to be translated, and display on a display unit translated language information including the meanings of the translated words, eg., Japanese words, their pronunciation, or their parts of speech.

FIG. 1 shows a perspective external view of such a conventional electronic dictionary, and FIG. 2 shows a block diagram depicting the internal configuration of such an electronic dictionary. In these diagrams, the English word to be translated is entered in alphabetical characters from keyboard 1 by a finger-pressing action of the operator. The alphabetical characters are fed to retrieval controller 3. Then retrieval controller 3 retrieves the corresponding English word from semantic dictionary 2, and the meaning and other items associated with the Japanese word corresponding to the English word are displayed on display panel 4.

The above electronic dictionary, however, requires keyboard input in alphabetic characters of the words or compound words to be translated, a process liable to input errors due to misreading of keys or misunderstanding, especially when the operator enters the words by looking at the source document and the keyboard alternately. Therefore, each time an input error is made, the word must be reentered by correcting the error. Thus, input has been slow, requiring more than the time it takes to consult an ordinary dictionary. Thus, the conventional electronic dictionaries have been far from being practical, and they have not been able to provide the full benefit of an electronic dictionary.

Further, when translating English words into Japanese, normally the operator has to write on the source document containing the English words so as not to forget the meanings in Japanese words output on the display panel. The procedure has thus been extremely cumbersome.

Further, if the word or compound word to be translated is in a variant form (e.g., the past tense or progressive form of a verb), in most cases the user has to take the trouble to keyboard input the original or canonical form of the word.

SUMMARY OF THE INVENTION

An object of the invention is to solve the above problems.

Another object of the invention is to provide a practical, easy-to-use electronic dictionary through improvements in electronic dictionary input procedures.

Another object of the invention is to provide an electric dictionary with improved output procedures.

A further object of the invention is to provide an electronic dictionary capable of translation even where words appear in their variant forms.

To solve the deficiencies inherent in the existing technology, this invention, concerning an electronic dictionary for the electronic translation of words or compound words in one language to the corresponding words or compound words in another language, is comprised of an optical reader which optically reads the language to be translated; and a translation unit which, based on the output information supplied by the optical reader, outputs the translated language corresponding to the target language. A display unit can be additionally provided to display the translated language produced by the translation unit.

In a preferred embodiment of the electronic dictionary the optical reader, translation unit, and display unit are part of an integral unit.

In another preferred embodiment, the optical reader is separate and independent from the main unit, which is comprised of the translation and display units, with the optical reader being electrically connected to the main unit by means of a connector cord.

The electronic dictionary configured as described above operates as follows:

Input of the words to be translated, which are recorded on a source document, is done by using the optical reader. The optical reader is comprised, for example, of a light source for illuminating the source document and a photoelectric sensor which converts the light reflected from the source document into electrical signals.

When the language to be translated is thus input, the translation unit, based on the result of reading by the optical reader, outputs the corresponding translated language information. The corresponding translated language information, for example, includes the meanings of the words, their pronunciation, and other information provided in an ordinary dictionary.

The display unit displays the translated language information comprised of the above information which is output from the translation unit.

According to this invention, optical input of the source language by the optical reader eliminates the errors inherent in keyboard input of the words to be translated, as done by conventional methods. The invention thus solves the existing problem.

The electronic dictionary can be provided with a printer which prints at least part of the translated language information produced by the translation unit.

In a preferred embodiment, the optical reader and the printer are disposed at fixed positions relative to each other so that said part of the translated language information will be printed at a fixed position relative to the input language.

Printing of the translated language information by a printer saves the operator the trouble of writing down the words.

In another preferred embodiment of the invention, the optical reader illuminates the medium containing the language to be translated with light from an external source.

For the illumination with light from an external source, a condenser lens may be provided to enable the optical reader to condense light from the external source. Alternatively, a condenser, e.g., a solar collector may be provided for condensing light from the external source.

In still another embodiment of the invention, the translation unit identifies, based on the output from the optical reader, variants of the language to be translated and, as a result of that identification, makes predetermined changes at the word ending or ignores the word endings, and produces translated language information corresponding to the original or canonical form of the word. Corresponding target language information may, for example, include the meanings of the canonical form of the source words, their pronunciation, and other information necessary in a dictionary.

According to this invention, optical input of the source language by the optical reader eliminates the errors inherent in keyboard input of the words to be translated, as done by conventional methods. Further, even if the language to be translated is a variant, the electronic dictionary is capable of producing translated language information consistent with the canonical from of the word, irrespective of its variation. This provides a function of an ordinary dictionary.

BRIEF DESCRIPTION OF THE DRAWINGS

In the accompanying drawings;

FIG. 3 is a block diagram showing the configuration of the electronic dictionary in a first embodiment of this invention.

FIG. 4 is a perspective view showing details of the optical reader in the electronic dictionary shown in FIG. 3.

FIG. 20, which is comprised of FIG. 20A and FIG. 20B, are flowcharts showing operation of another example of the retrieval controller.

DETAILED DESCRIPTION OF THE PREFERRED EMBODIMENTS

The following describes embodiments of this invention with reference to the drawings.

Figure 1:
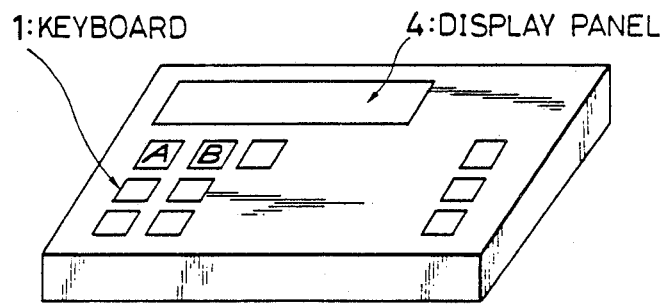
FIG. 1 is a perspective view indicating the external view of a conventional electronic dictionary.
Figure 2:
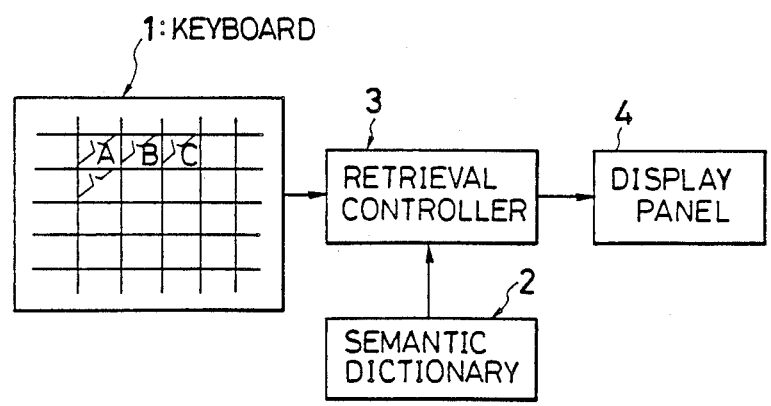
FIG. 2 is a block diagram indicating the configuration of the electronic dictionary shown in FIG. 1.
Figure 5:
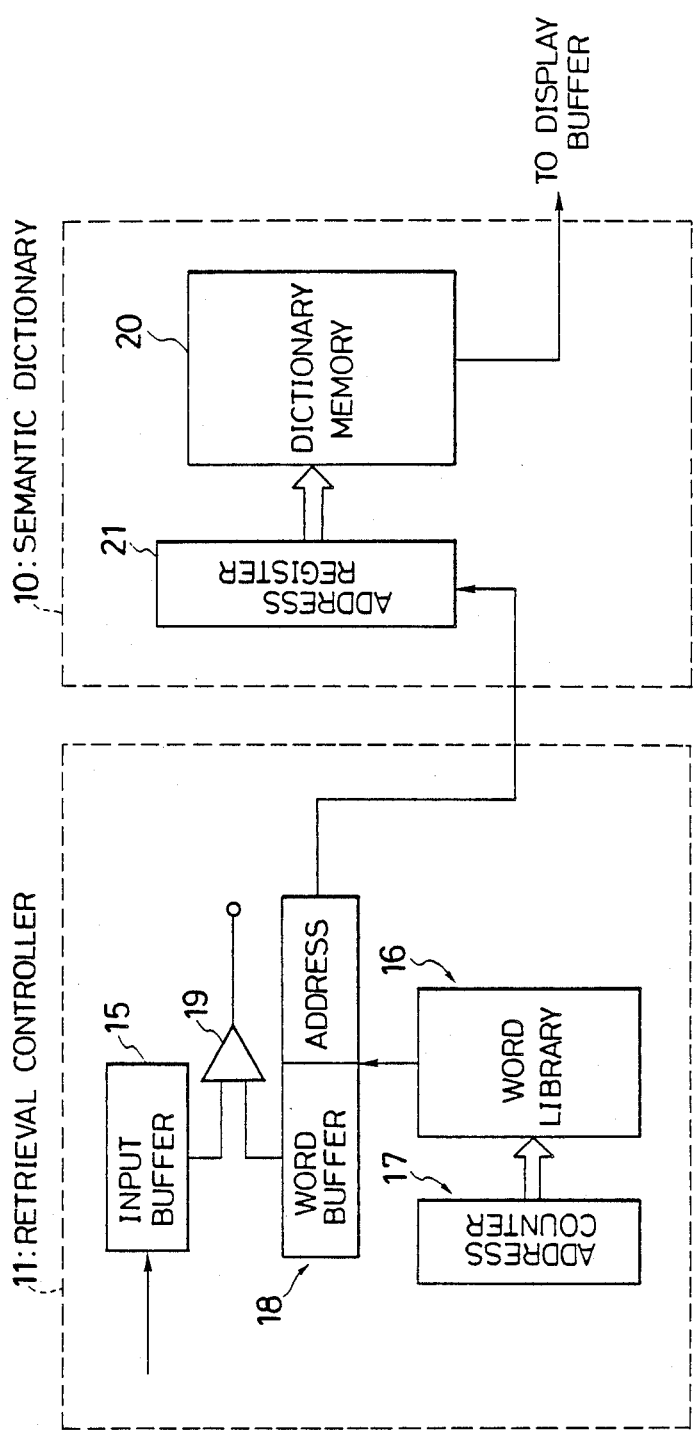
FIG. 5 shows details of the semantic dictionary and the retrieval controller comprising the electronic dictionary shown in FIG. 3.

FIG. 3 shows the internal configuration of an electronic dictionary, constituting a first embodiment of this invention. FIG. 4 shows a detailed diagram of the optical reader shown in FIG. 3. FIG. 5 shows a detailed diagram of the semantic dictionary and retrieval control unit shown in FIG. 3.

The electronic dictionary of this embodiment translates English words or compound words to the corresponding Japanese words or compound words, and also provides other information normally found in a usual dictionary, such as pronunciation, example of usage, and parts of speech and word origin.

As shown in FIG. 3, the electronic dictionary is comprised of optical reader 5, analog/digital converter (abbreviated as A/D converter) 6, preprocessor 7, recognition dictionary 9, recognition controller 8, semantic dictionary 10, retrieval controller 11, and display panel 12.

As shown in FIG. 4, optical reader 5 is comprised of light source 5a which illuminates source document 14 on which the English words to be translated are printed, lens 5b which condenses the light from light source 5a onto source document 14, lens 5c which forms an image of the reflected light from source document 14 on pickup sensor 5d, and pickup sensor 5d which converts the light from the image into electrical signals indicating brightness and darkness. Pickup sensor 5d can be a CCD a sensor, for example. A/D converter 6 converts the analog signals from pickup sensor 5d into digital signals, supplying the digital signals to preprocessor 7. Preprocessor 7, in addition to converting received digital signals into binary signals, performs smoothing, noise removal, and the like. Recognition dictionary 9 contains standard alphabetic character patterns for the recognition of optically read alphabetic characters. Recognition controller 8, based on the standard patterns contained in recognition dictionary 9, identifies the binary signals, or alphabetic characters that have been read. Briefly stated, the identification method can be divided into pattern matching and structural analysis. Pattern matching consists of pre-storage of two-dimensional images of characters in the dictionary as they are, and a process of matching a given input pattern, comprised of binary signals that have been read, with a pattern in the dictionary. Structural analysis consists of extraction of partial profiles of characters from the characters; dictionary storage of descriptions of the extracted partial profiles, and their interrelationships; and a process of matching a given input pattern with the stored information. In this embodiment the identification of alphabetic characters that are read can be done by either pattern matching or structural analysis method.

Since headings and the first letter of the first word of a sentence in English are written in uppercase, the recognition controller ignores cases when identifying a character.

Semantic dictionary 10 contains dictionary storage of Japanese language data corresponding to the English words that have been read in, including word meaning, pronunciation symbols, related grammar, sentence examples using a given word, synonyms and antonyms. Retrieval controller 11 retrieves from semantic dictionary 10 the Japanese word corresponding to a given English word that has been read. As shown in FIG. 5, the retrieval controller 11 has an internal configuration which includes: input buffer 15 which is used for temporary storage of character codes for the storing of alphabetic characters corresponding to the single word which has been identified by recognition controller 9; word library 16 which contains the starting address of dictionary memory 20 (more on this later) which contains English words to be translated and the meanings of the corresponding Japanese words; address counter 17 for scanning the English words stored in word library 16; register 18 for temporary storage of the English words and their starting addresses which are read from word library 16; and gate 19 which determines whether the English words obtained from input buffer 15 and register 18 match. Semantic dictionary 10, on the other hand, consists of dictionary memory 20 containing Japanese language information, such as the meanings of Japanese words and their pronunciation symbols, as discussed above; and register 21 which specifies the address for dictionary memory 20.

Display panel 12 displays the translated Japanese language information which is retrieved by retrieval controller 11.

The following describes the operation of the electronic dictionary of the above configuration.

When source document 14 containing the English words to be translated is illuminated by light source 5a, as shown in FIG. 4, the reflected light is fed into pickup sensor 5d through lens 5c. Pickup sensor 5d converts the reflected light into electrical signals which are fed into recognition controller 8 after undergoing binarization and related treatment in preprocessor 7. Then recognition controller 8, using the aforementioned pattern matching or structural analysis method, and by referencing the alphabetical standard patterns stored in recognition dictionary 9, identifies the individual alphabetic characters that have been read. It then sends English word character codes, consisting of a group of identified alphabetic characters, to retrieval controller 11.

Figure 6:
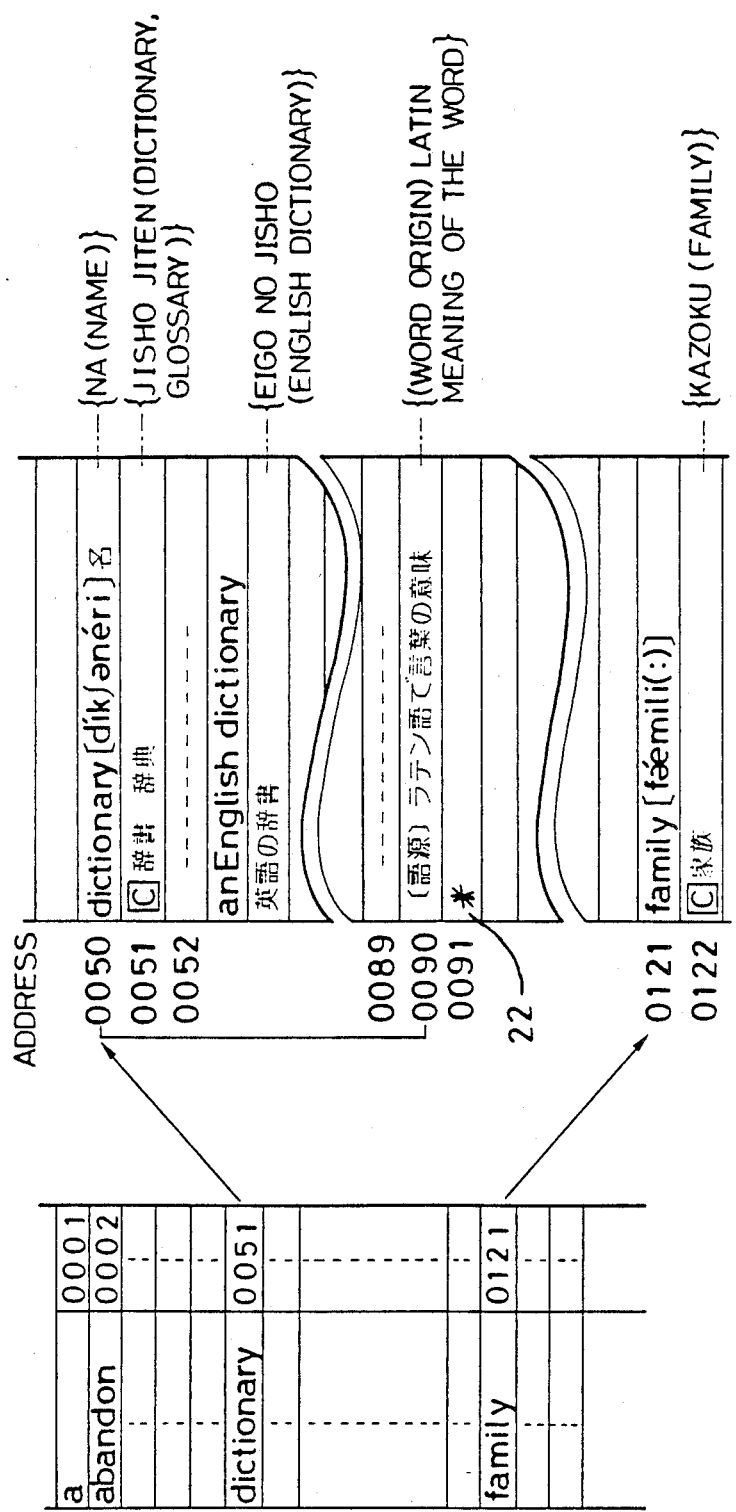
FIG. 6 shows an example of a word library and a dictionary memory storage.

FIG. 6 shows examples of word storage in word library 16 and dictionary memory 20. In FIG. 6, the alphabetical writing in { } connected by chain line with Japanese characters is not actually in the dictionary but are inserted in the figure for explanation to English readers.

The following describes the translation operations. The string of alphabetic codes equivalent to a single word that has been identified is stored in input buffer 15 shown in FIG. 5. Then the English word and its address code ("a" and "0001" in FIG. 6) are sent from the beginning of word library 16 to the word buffer and address in register 18. Gate 19 then determines whether or not the character code (English word that has been read in) stored in input buffer 15 matches the English word stored in register 18. If there is no match, "1" is added to address counter 17, which causes the next English word and address ("abandon" and "0002" in the figure) in word library 16 to be sent to register 18. Then, as described above, gate 19 determines whether or not the word in register 18 matches the English word that has been read in. Thus, the words in word library 16 continue to be read until a match is found between the English word that has been read in and an English word read from word library 16. When a match of English words is determined by gate 19, the address contained in register 18 at that time is sent to address register 21 of semantic dictionary 10. Suppose, for example, that the English word that has been read is "dictionary" and that this has been retrieved. Then, as shown in FIG. 5, the code for address "0051" is sent to address register 21. Semantic dictionary 10 transfers the contents of dictionary memory 20, using the address specified by address register 21 as starting addresses, one by one to a display buffer which is not shown in the figure (although in this embodiment the display buffer is provided in retrieval controller 11, it can be in semantic dictionary 10). In terms of the above "dictionary" example, this operation is carried out until an endmark 22, "*", in FIG. 6 is encountered, i.e., until the contents of address 0051–0090 have been transferred. The string of alphabetic characters thus read optically are converted to corresponding Japanese word information including Japanese word meaning, which is then displayed on display panel 12 via the display buffer.

Figure 7:
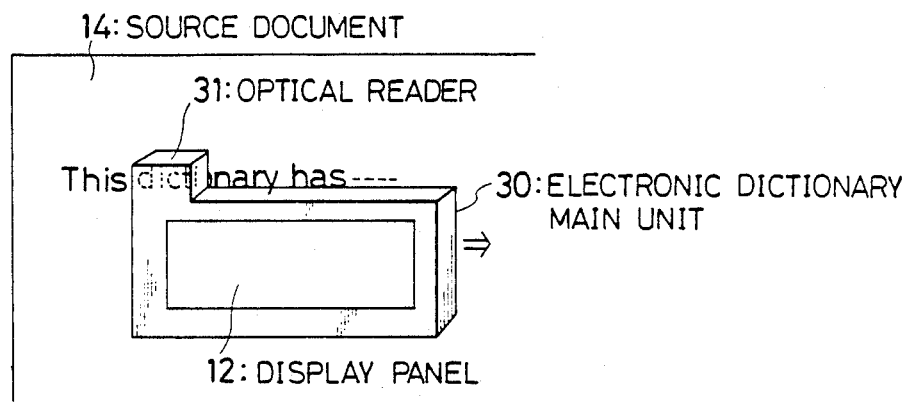
FIG. 7 is a perspective external view of the hand-held electronic dictionary.

FIG. 7 shows a perspective external view of the electronic dictionary used in this embodiment. The type of electronic dictionary in FIG. 7 is a hand-held electronic dictionary. The upper protrusion of the electronic dictionary main unit, containing the elements shown in FIG. 3, contains integrated optical reader 31 (of the same configurations as the optical reader shown in FIG. 3). To optically read the English word to be translated by using such an electronic dictionary, the user, using one hand, lifts electronic dictionary main unit 30, brings optical reader 31 to the beginning of the English word to be translated, and while holding optical reader 31 against source document 14 at that position, scans the document to the right as shown in the figure. Then the alphabetic characters on source document 14 are optically read, subsequently converted to Japanese language information by the above described operations, and are displayed on display panel 12.

Means are provided to keep the space between the surface of the source document and the light receiving surface of the image sensor. Such means may comprise protrusions 3a as shown in FIG. 3. The protrusions should be slidable on the source document 14.

Figure 8:
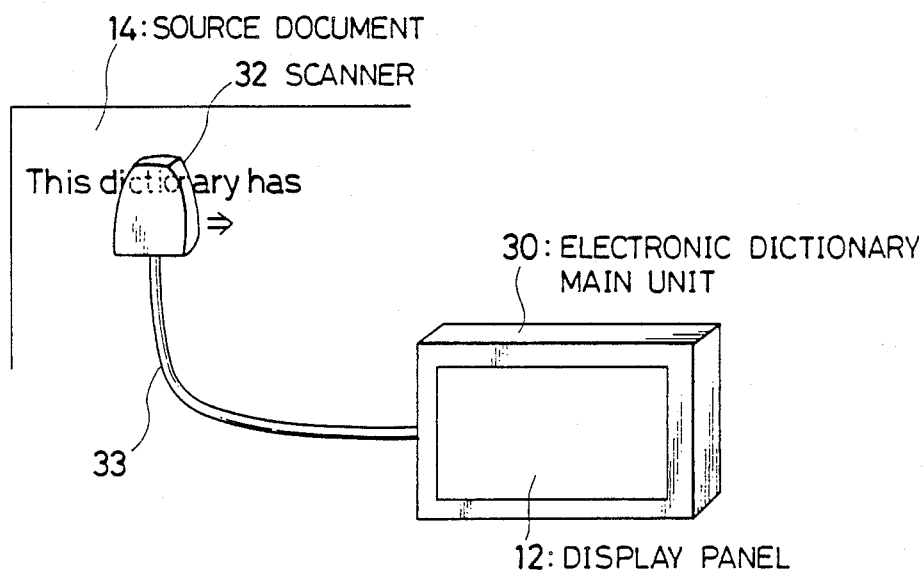
FIG. 8 is a perspective external view of the hand-held electronic dictionary according to a second embodiment.

FIG. 8 shows the electronic dictionary used in a second embodiment of this invention. It consists of scanner 32 containing a built-in optical reader (FIG. 3), separate from electronic dictionary main unit 30a (configuration shown in FIG. 3 with the optical reader removed), and in which the two units are electrically connected with connector cord 33. In this type of electronic dictionary, scanner 32 is held against source document 14, and as described with reference to FIG. 7, source document 14 is scanned by scanner 32, and the information picked up by the scanning process is transferred to main unit 30 via connector cord 33, and the translated Japanese word information is displayed on display unit 12 which is part of main unit 30. Thus, a hand-held electronic dictionary allows simple, easy document reading and input. Further, the electronic dictionary shown in FIG. 6, requiring only scanning by scanner 32, makes for extremely handy optical scanning of the source document.

As described above, the above-described embodiments allow the optical input of the English words to be translated from the optical reader, reducing the input errors stemming from keyboard operation in conventional methods, enhancing operational speed and offering electronic dictionary functions that are suited to practical applications.

Also, where the optical reader is made separate and independent from the electronic dictionary main unit, and is connected to the main unit via a connector cord, operation of the optical reader is simple, facilitating the input of the words to be translated.

Figure 9:
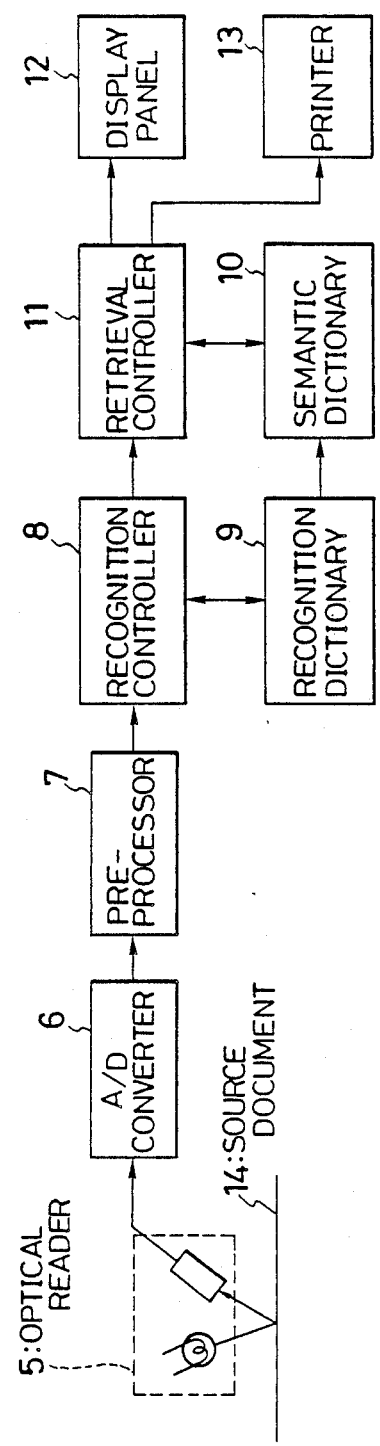
FIG. 9 is a block diagram showing the configuration of the electronic dictionary in another embodiment of this invention.

FIG. 9 shows another embodiment of the invention. The configuration of this embodiment is generally identifical to that of the embodiment of FIG. 3. But a printer 13 is provided to print the Japanese language information displayed on display panel 12.

Figure 10A:
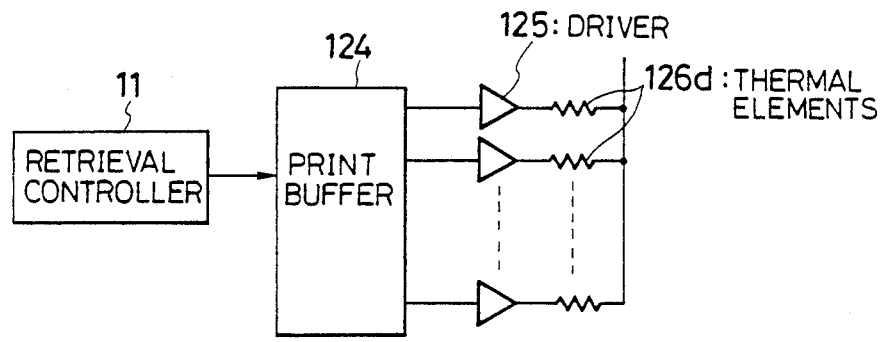
FIGS. 10A, 10B and 10C are views showing the details of the printer.
Figure 10B:
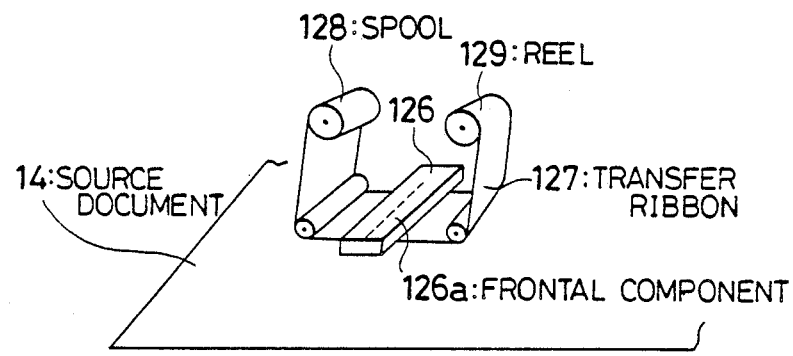
Figure 10C:
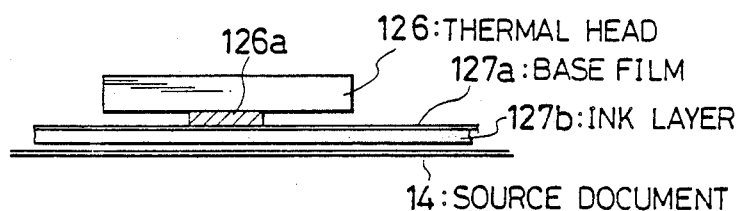

FIGS. 10A, 10B and 10C show, as an example of a printer, details of a thermal transfer printer using a thermal head. In FIG. 10A, the printer for the main part consists of printer buffer 124 which receives as print data the Japanese language information from dictionary memory 20 (FIG. 5); and drivers 125 provided to drive respective thermal elements 126d, which are serially connected to drivers 125. FIG. 10B is a schematic perspective drawing showing the thermal head 126 consisting of an array of thermal elements 126d that is mounted in actual situations. Transfer ribbon 127 passes in front of thermal head 126. This transfer ribbon 127 is pulled out from spool 128 and taken up by reel 129. FIG. 10C is an enlarged side view showing the relationship between thermal head 126 and transfer ribbon 127. As shown in the figure, transfer ribbon 127 is situated at frontal part 126a of thermal head 126, and transfer ribbon 127 is comprised of base film 127a, and ink layer 127b which is provided in a layer on one side of the ribbon. The principal constituent of ink layer 127b is wax which melts when heat is applied. Ink 127b, heated and melted in part by thermal head 126 is transferred to the source document 14 which is placed in front of the head. When semantic dictionary 10 transfers the contents of dictionary memory 20, using the addresses specified by address register 21 as starting addresses, one by one to a display buffer which is not shown in the figure (although in this embodiment the display buffer is provided in retrieval controller 11, it can be in semantic dictionary 10), it also transfers the dictionary memory contents to print buffer 124 (FIG. 10A).

In terms of the above "dictionary" example, this operation is carried out until endmark 22, "*", in FIG. 6 is encountered, i.e., until the contents of address 0051-0090 have been transferred. The string of alphabetic characters thus read optically are converted to Japanese word information, which is displayed on display panel 12 via the display buffer.

Printer 13 stores the Japanese language information (print data) from dictionary memory 20 in print buffer 124 via the retrieval controller 11 (FIG. 10A). Subsequently, by appropriate timing provided by the timing generator which is not shown in the figure, print data corresponding to one vertical dot line are read from buffer 124, causing thermal dots 126d to be heated by means of drivers 125. This, as shown in FIG. 10C, melts ink layer 127b on transfer ribbon 127, resulting in thermal transfer of one dot line of print data to source document 14 which is placed in front of the ribbon. In this manner, printing of all the lines is performed according to the timing signals which are supplied sequentially.

Figure 11:
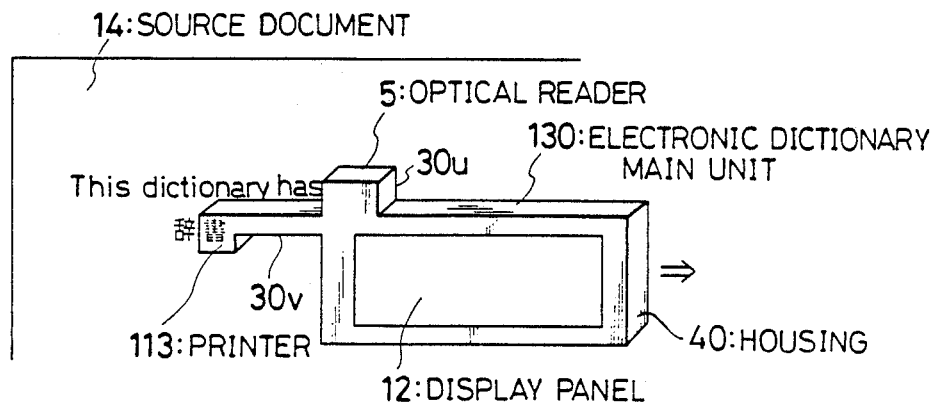
FIG. 11 is a perspective external view of the hand-held electronic dictionary.

FIG. 11 shows a perspective external view of the electronic dictionary used in this embodiment. The type of electronic dictionary in FIG. 11 is a hand-held electronic dictionary. The upper protrusion 30u of the housing 40 of the electronic dictionary main unit 130, containing the elements shown in FIG. 9, contains integrated optical reader 5 (of the same configurations as the optical reader 5 shown in FIG. 3). Another protrusion 30v, located below optical reader 105 at a fixed distance from it, contains integral printer 13 (FIG. 9) in the protruding portion 113. To optically read the English word to be translated by using such an electronic dictionary, the user, using one hand, lifts electronic dictionary main unit 130, brings optical reader 105 to the beginning of the English word to be translated, and while holding optical reader 5 against source document 14 at that position, scans the document to the right as shown in the figure.

During this operation, the printer is spaced a predetermined distance behind the optical reader in the direction of scan so that the printer is positioned between the English word being read and an English word in the following line during the printing following the translation processing. When the English word is scanned by the optical reader so that the alphabetic characters on source document 14 are optically read, their Japanese language information is displayed on display panel 12 and at the same time is printed by printer 13 between the lines, during the scan, contemporaneously (substantially simultaneously) with the optical reading adjacent to the English word, in this case (with only the delay for translation processing). It is also possible to print only the meaning of the word from the Japanese language information.

Figure 12:
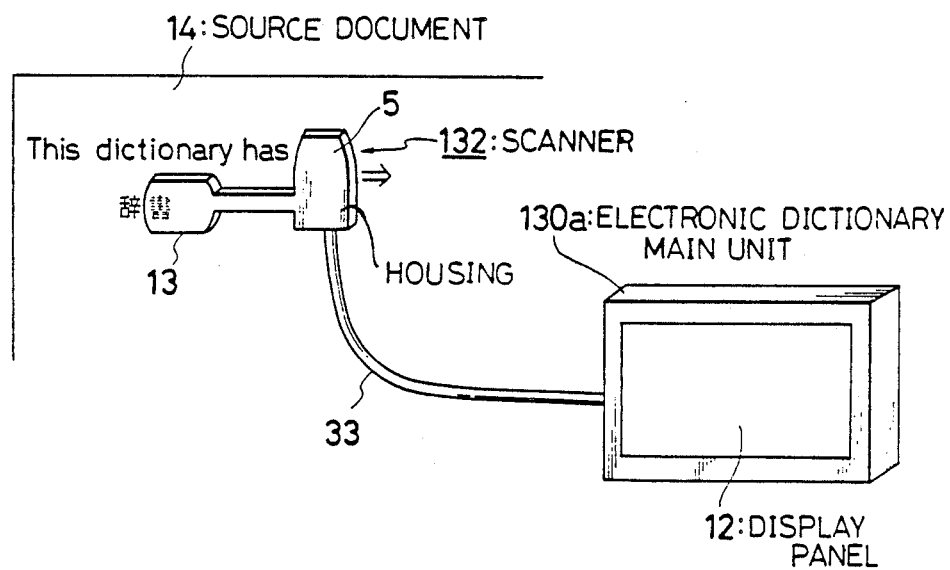
FIG. 12 is a perspective external view of the hand-held electronic dictionary according to another embodiment.

FIG. 12 shows the electronic dictionary used in another embodiment of this invention. It consists of scanner 132 containing an integrated optical reader and a printer which is at a fixed position relative to the optical reader, the scanner being separate from electronic dictionary main unit 130a (configuration shown in FIG. 9 with optical reader 5 and printer 13 removed), and in which the two units are electrically connected with connector cord 33. In this type of electronic dictionary, scanner 132 is held against source document 14, and as described with refferrence to FIG. 11, source document 14 is scanned by scanner 132, and the information picked up by the scanning process is transferred to main unit 130a via connector cord 33, and the translated Japanese word information is displayed on display unit 12 which is part of main unit 130a. At the same time, printer 13 prints the meaning of the English word which has been read, below the word and between lines. Thus, a hand-held electronic dictionary allows simple, easy document reading and input. Further, the electronic dictionary shown in FIG. 12, requiring only the scanning by scanner 132, makes for extremely handy optical scanning of the source document.

As described above, the embodiments of FIGS. 9 to 12 allows printing the meanings of words or compound words translated between print lines on the source document, and thereby saves the operator the trouble of writing down translated words, freeing him from cumbersome operations. Thus, this invention provides an electronic dictionary with improved operational speed, suitable for practical use.

Figure 13:
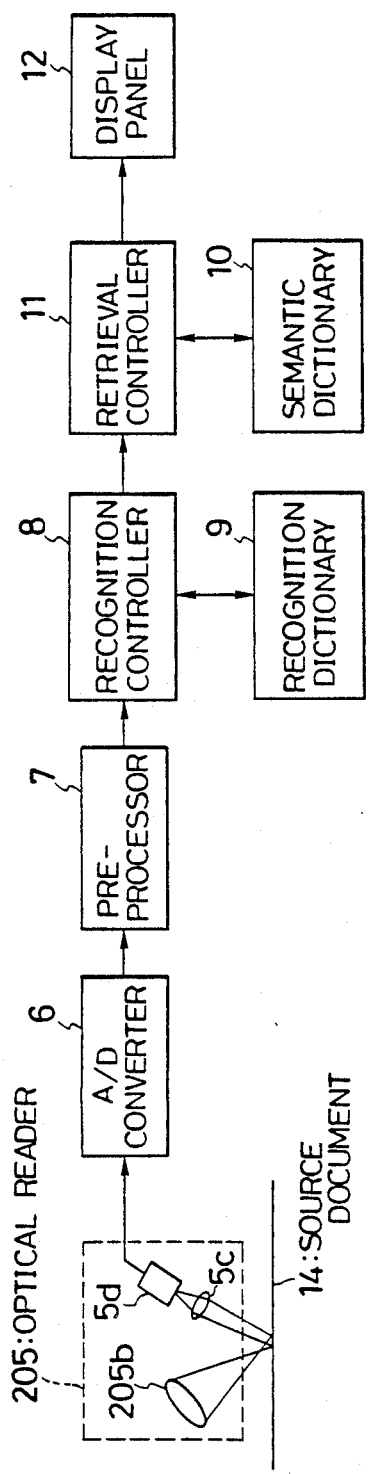
FIG. 13 a block diagram showing the configuration of the electronic dictionary in another embodiment of this invention.
Figure 14:
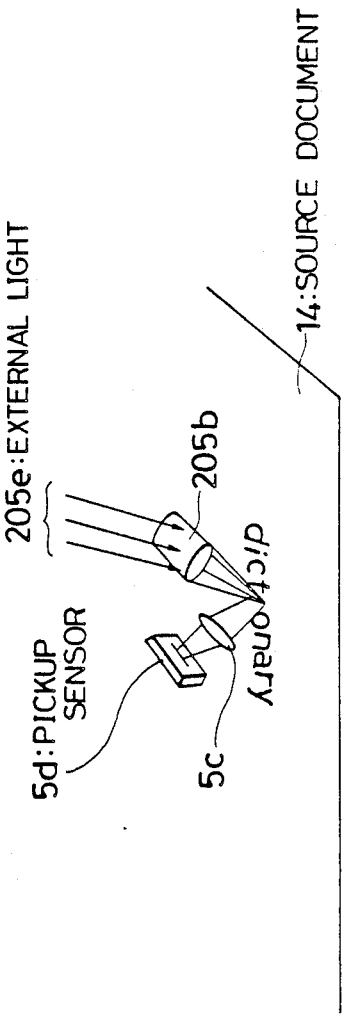
FIG. 14 is a schematic diagram showing an example of the optical reader which can be incorporated in the electronic dictionary of FIG. 13.

FIG. 13 shows another embodiment of the invention. This embodiment is generally identical to the embodiment of FIG. 3. But, as is shown in detail in FIG. 14, an optical reader is comprised of lens 205b which condenses light from external source 205e (light supplied from a light source external to the electronic dictionary) onto source document 14 containing the English words to be translated.

The optical reader requires no light source for illuminating the source document. It lends itself to a simple configuration. As a result, the whole electronic dictionary can be made light and compact, suitable as a portable unit.

Figure 15:
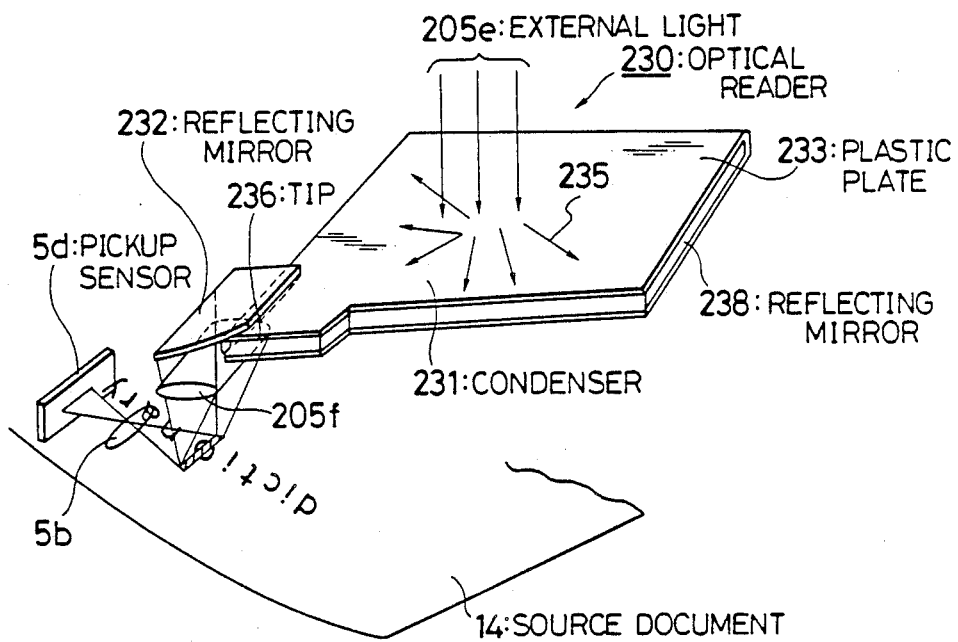
FIG. 15 is a schematic diagram showing another example the optical reader which can be incorporated in the electronic dictionary of FIG. 13.
Figure 16:
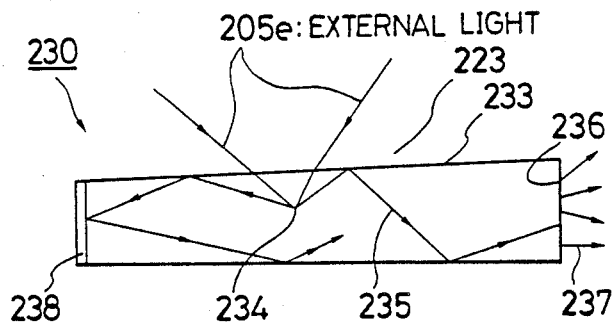
FIG. 16 is a diagram illustrating the operating principles of the light collector in the optical reader shown in FIG. 15.

Another example of an electronic dictionary in which the source document is illuminated by light from an external source is shown in FIGS. 15 and 16.

FIG. 15 is a perspective external view of the optical reader. FIG. 16 illustrates the operating principles of a light collector in the optical reader shown in FIG. 15.

The electronic dictionary in the second embodiment of this invention has a configuration identical to the electronic dictionary in the first embodiment, except for the optical reader. Optical reader 230 in this embodiment, as shown in FIG. 15, is comprised of a generally planar light collector 231 which condenses light from external source 5e; reflecting mirror 232 which reflects the light from light collector 231; lenses 205f and 5b; and pickup sensor 5d. Light collector 231, as shown in FIG. 16, is provided with transparent plastic plate 233 in which is diffused fluorescent dye 234. Light from external source 205e, entering the interior of plastic plate 233 from its surface, strikes fluorescent dye 234; fluorescent light emitted from this location propagates forward while being totally reflected by the surface of plastic plate 233. Most of this is guided to tip 236 (FIGS. 15 and 16) of light collector 231, and is radiated to the outside in the form of condensed light 237. Light from external source 205e, entering from a large surface area, is thus condensed on tip 236 of light collector 231. If the other end of plastic plate 233 is blocked with reflecting mirror 238, the light undergoes further condensation, and is radiated in high power from tip 236 which is open. The high-powered condensed light undergoes directional changes by reflecting mirror 232, as shown in FIG. 15, enters lens 205f, where it undergoes further condensation, and strikes source document 14 as a beam. The reflected light, then, as described in the first embodiment, is converted to electrical signals by pickup sensor 5d through lens 5b. The working principles of light collector 231 performing the above functions have been developed by BASF and an experimental version of it, named "Solar Collector", can be obtained from Morishita Sangyo Kabushiki Kaisha.

Figure 17A:
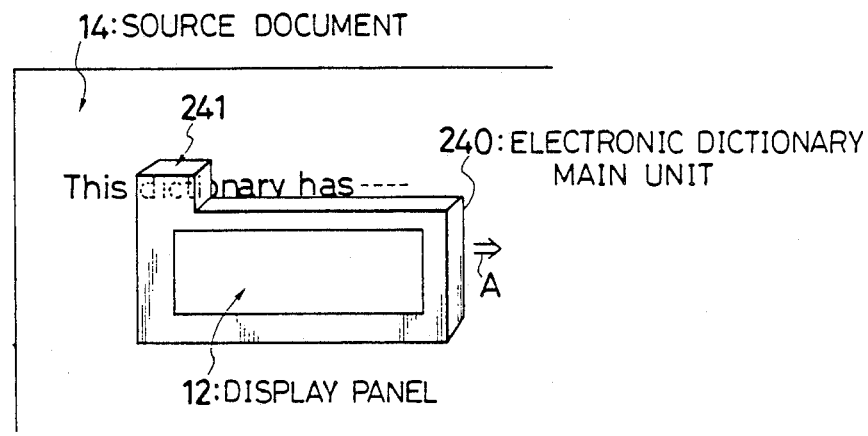
FIGS. 17A and 17B are perspective views showing examples of the configuration electronic dictionary incorporating the optical reader of FIG. 14 or 15.
Figure 17B:
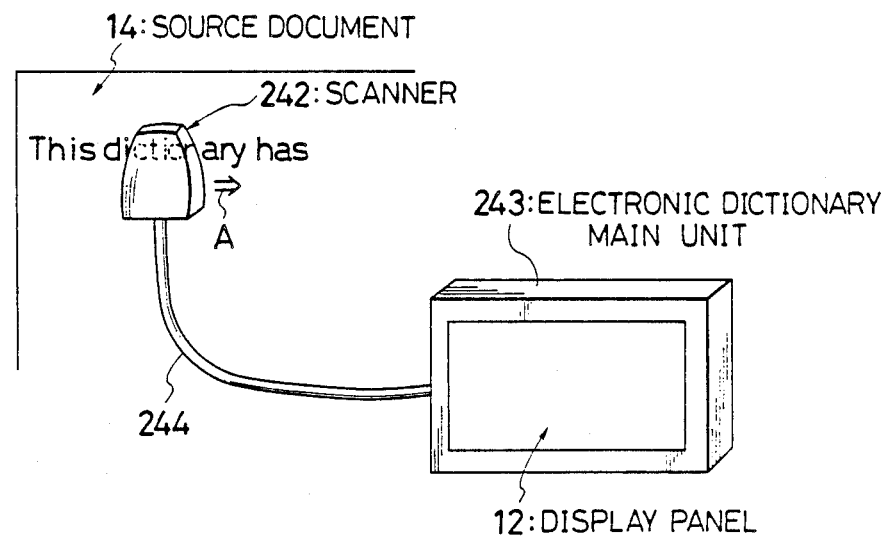

FIGS. 17A and 17B are external views of different examples of the electronic dictionary incorporating the light collector shown in FIGS. 15 and 16.

FIG. 17A shows a hand-held electronic dictionary. Electronic dictionary main unit 240 is an integrated unit of the elements shown in FIG. 3. Upper protrusion 241 of main unit 240 contains the optical reader 5, 230. To optically read the English word to be translated by using such an electronic dictionary, the user, using one hand, lifts electronic dictionary main unit 240, brings the optical reader (protrusion 241) to the beginning of the English word to be translated, and while holding the optical reader against source document 14 at that position, scans the document in a direction A to the right in the figure. Then the alphabetic characters on source document 14 are optically read, subsequently converted to a Japanese word by the above described operations, and are displayed on display panel 12. In the configuration of FIG. 17A, the light collector of FIGS. 15 and 16 can be formed to cover the entire surface of the assembly including the display panel. The light collector is transparent so that it does not interfere with the function of the display. As an alternative, the condenser lens of FIG. 14 can also be used.

FIG. 17B is an external view of another preferred example of an electronic dictionary, wherein scanner 242 containing built-in optical readers 230 is provided as a separate unit from electronic dictionary main unit 243 (having a configuration in which the optical reader has been removed), and in which the two units are electrically connected with connector cord 244. In this type of electronic dictionary, scanner 242 is held against source document 14, and as described in FIG. 17A above, source document 14 is scanned with scanner 242, and the information picked up by the scanning process is transferred to main unit 243 via connector cord 244, and the translated Japanese word information is displayed on display unit 12 which is part of main unit 243. Thus, a hand-held electronic dictionary allows simple, easy document read and input. Further, the electronic dictionary shown in FIG. 17B, requiring only scanning by scanner 242, makes for extremely handy optical scanning of the source document. In the configuration of FIG. 17B, the light collector of FIGS. 15 and 16 can be formed to cover the scanner 242 alone. The condenser lens of FIG. 14 can be used as an alternative.

The embodiments of FIGS. 13 to 17A, 17B are distinguished by the use of external light for read-input of the words to be translated. It thereby eliminates the need for a light source for the optical reader. This relieves the operator of the burden of switching the power for the light source on and off and makes it possible to reduce the size and weight of the electronic dictionary, thus providing a portable, practical electronic dictionary.

Figure 18:
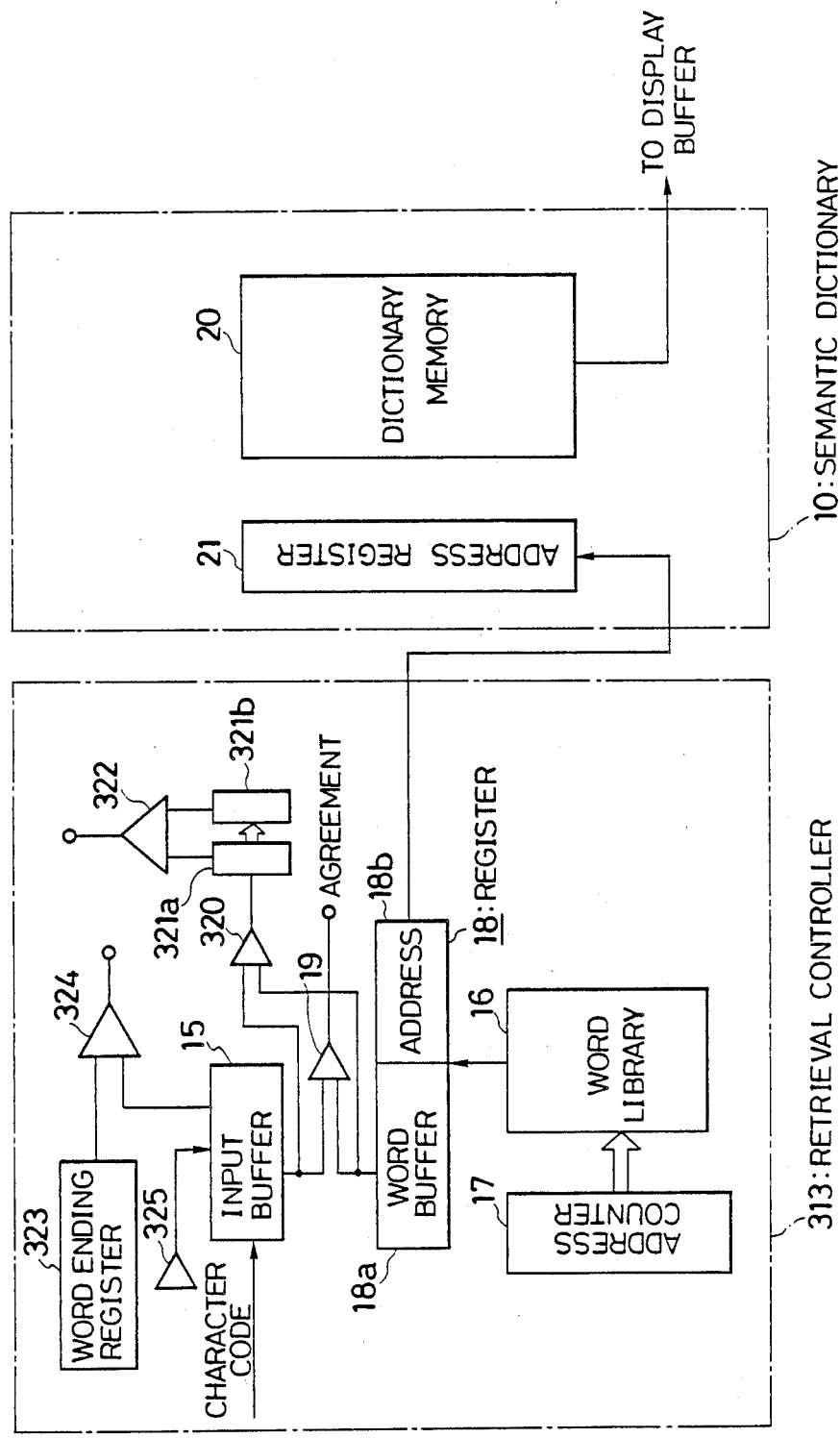
FIG. 18 shows details of the semantic dictionary and the retrieval controller incorporated in another embodiment of the electronic dictionary shown in FIG. 1.

FIG. 18 shows an internal configuration of retrieval controller 313 of a further embodiment. The overall configuration of this embodiment is identical to the embodiment of FIG. 3. But the retrieval controller 313 of this embodiment differs in the following respects. Namely, it is provided with gate 320 which checks the number of successive characters as counted from the beginning in which input buffer 15 and the word buffer 18a in register 18 match; memory buffer 321a which stores the current number of matching characters; memory buffer 321b which stores the number of matching characters obtained during the last word lookup operation (the contents of buffer 321a are shifted to buffer 321b each time a word lookup is performed); gate 322 which determines which of the matching character counts stored in buffers 321a and 321b is larger; word ending register 323 which stores a library of word ending changes, such as "ed" and "ing"; check gate 324 which checks for agreement between the word endings in register 323 and input buffer 15; and a modification gate 325 which modifies the word ending in input buffer 15.

Figure 19:
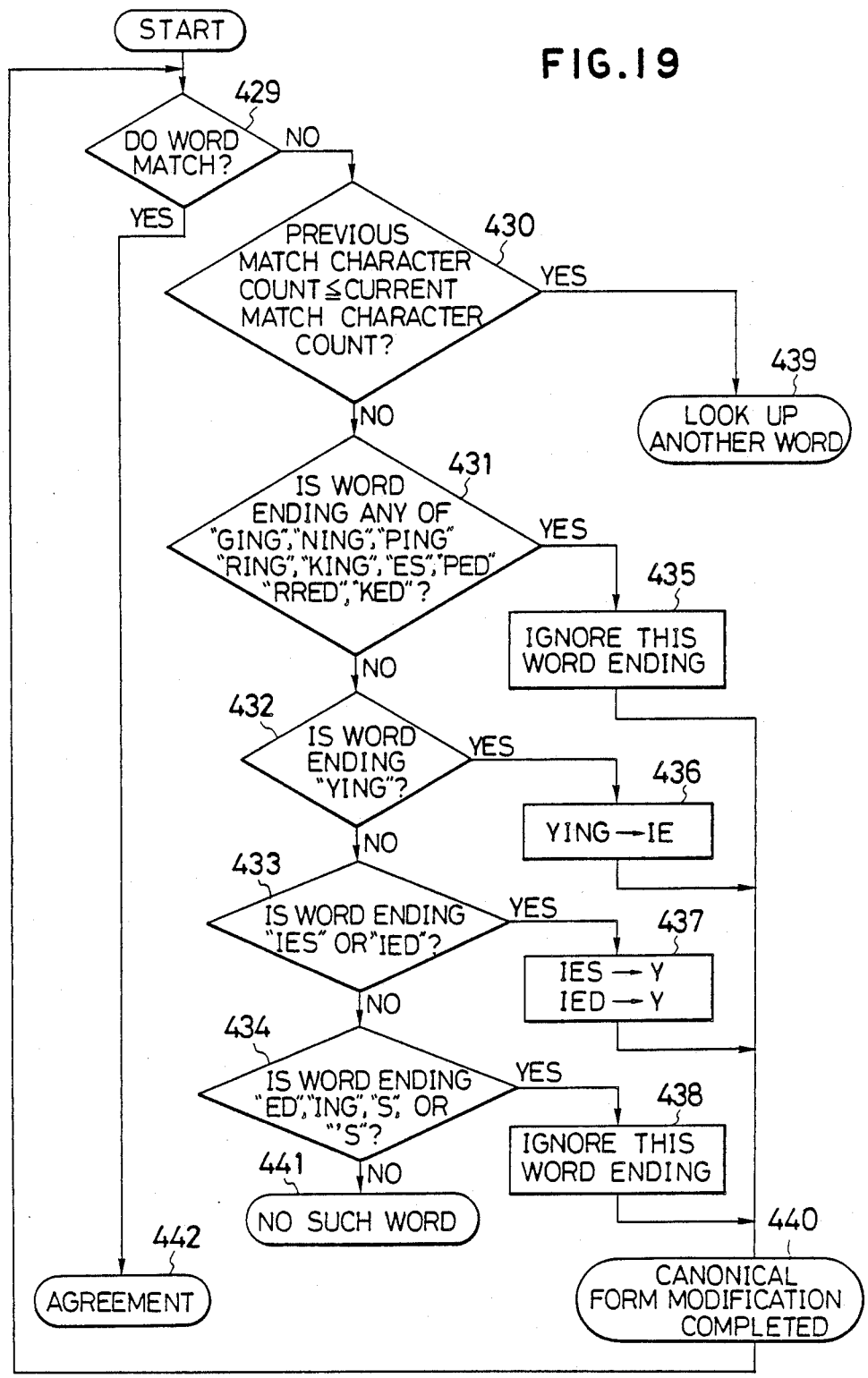
FIG. 19 is a flowchart illustrating the operation of the retrieval controller.

FIG. 19 is a flowchart illustrating the operation of retrieval controller 313. The string of alphabetic codes equivalent to a single word that has been identified in recognition controller 8 is stored in input buffer 15, shown in FIG. 18. Then the English word and its address code ("a" and "0001" in the figure) are sent from the beginning of word library 16 to word buffer 18a and address 18b in register 18. Gate 19 then determines whether or not the character code (English word that has been read in) stored in input buffer 15 matches the English word stored in register 18 (Step 429 in FIG. 19). If there is a match, the word lookup terminates (Step 442). If there is no match, gate 322 determines whether the previous match character count (buffer 321b) or the current match character count (buffer 321a) is larger (Step 430). If the current match character count is greater than or equal to the previous one, the next word is looked up (Step 439).

On the other hand, if the current match character count is less than the previous one, it means that the lookup process has gone past the word sought, indicating that either the word is not in the dictionary or the given word contains a word ending change. In such a case, the output from gate 322 (FIG. 18) is supplied to the controller which is not shown in the figure. Then, according to an instruction from the controller, check gate 324 determines whether or not the word endings in input buffer 15 and word ending register 323 match (Step 431). If the word to be translated has a special form of variation, such as in the case of a present participle or verb-noun, with "ing" attached, (e.g., "ging" or "ning"), or in the case of the plural form with "s" attached, or in the case of the past tense with "ed" attached (e.g., "rred"), then check gate 324 changes the variant word into its original form by ignoring the word ending (Steps 435 and 440). The word modification is done by word ending modification gate 325 on the word contained in input buffer 15, according to an instruction from the controller which has received output from check gate 324. If the word ending variation in a given word fails the test at Step 431, and if it is determined that a variant of the word ending "ing" is "ying" (Step 432), the word ending "ying" is modified to "ie" by word ending modification gate 325 (Step 436 and 440). If a given word ending is either "ies" or "ied", it is changed to "y" in both cases (Steps 437 and 440). Finally, if a word ending is not a special variant, i.e., simple addition of "ed" for the past tense of a verb; addition of "ing" to transform a verb into a present particle or verb-noun; or addition of "s" to in the plural form of a noun; or a word having the ending "'s" indicating the possessive case; such word endings are all ignored by gate 325 (Steps 438 and 440). It is by these procedures that word ending variations are processed. If control is passed to Step 339 following the above processing steps, i.e., if the next word is to be looked up, "1" is added to address counter 17 which causes the next word and address (e.g., "abandon" and "0002" in the figure) in the word library to be stored in register 18. Then, similarly, gate 19 determines whether or not the word in register 18 matches the English word that has been read in. Thus, the words in word library 16 continue to be read until a match is found between the English word that has been read in and an English word read from word library 316.

If Step 440 has been reached, word lookup is performed again, this time on the variant word whose word ending has been modified (canonical word) (Step 429).

If Step 441 has been reached, it means that the word being sought is not in word library 16. In this case, for example, in accordance with the output from check gate 324, the controller, which is not shown in the figure, displays a message to that effect on display panel 312, and terminates the operation.

As described above, the above embodiment identifies variants of a given word to be translated and to obtain the translated language information corresponding to the canonical form of the word to be translated. This eliminates the need for correcting variant words into their original forms before entry into the dictionary, as is the case with conventional methods. Moreover, this feature combined with use of the optical reader offer practical electronic dictionaries with improved operability.

In the embodiment of FIG. 19, some of word endings are shown to be taken care of, but it may be so arranged that other word endings are also taken care of. Such other examples include those of the comparatives of adjectives and adverbes (e.g., "er", "ier", "ger") and those of the superlatives of adjectives and adverbes (e.g., "est", "iest", "gest").

As an alternative to the procedure shown in FIG. 19, it may be so arranged that after any of the steps 435, 436 and 437 of word ending modification, the steps 429 and 430 are performed on the word that has been modified and if the answer at the step 430 is negative, the steps 432, 433 and 434 are performed. This procedure is illustrated in FIG. 20.

In the various embodiments described above, the retrieval starts with the first word of the dictionary. But it may be so arranged that the retrieval starts with the first word that begins with the character of the word that has been input (i.e., optically read).

What is claimed is:

1. An electronic dictionary for electronic translation of words or compound words in a source language at locations on a source medium, to corresponding words or compound words in a target language, the electronic dictionary comprising:

a housing;

an optical reader fixedly mounted in said housing so as to be fixed relative thereto, which optically reads from the source medium the source language to be translated;

a translation unit which produces, on the basis of data output from the optical reader, an output in target language, corresponding to the source language; and means, including a printer fixedly mounted in said housing so as to be fixed relative to said housing and said optical reader, for automatically printing the target language produced by the translation unit at a fixed position on said source medium relative to the location on the source medium of the source language corresponding to the target language to be printed.

2. An electronic dictionary as in claim 1, wherein said optical reader comprises means for optically reading the source language during a single scan of the source language by the optical reader, said printing means comprises means for automatically printing the target language on the source medium during the single scan after the output in target language is produced by said translation unit.

3. An electronic dictionary as in claim 2, wherein said printing means comprises means for printing the target language on the medium immediately below the word or compound word of the source language to which the target language corresponds during the scan of the source language by said optical reader.

4. An electronic dictionary as in claim 2, wherein said printing means comprises means for printing the target language on the medium in the vicinity of the word or compound word of the source language to which the target language corresponds during the scan of the source language by said optical reader.

5. An electronic dictionary as in claim 2, wherein the source medium is a document and the source language includes a text of words or compound words printed in lines; and said printing means comprises means for printing the target language between a line in which is provided the word or the compound word of the source language corresponding to the target language and a next line during the scan of the word or compound word by said optical reader.

6. An electronic dictionary as in claim 2, wherein the scan of the source language is performed by a scanning movement of the entire electronic dictionary and said printing means is spaced a fixed distance from said optical reader in a direction of the scan so as to compensate for the scanning movement of the electronic dictionary during a delay between the optical reading of source language by said optical reader and the printing of the target language by said printing means while the translation unit translates the output of said optical reader into the output in target language, so that the printing means prints the target language adjacent to the corresponding source language.

7. An electronic dictionary as in claim 1, wherein said optical reader faces in a given direction for reading in the source language to be translated from the source medium, and said printer is disposed adjacent said optical reader and faces in said given direction so as to facilitate printing of the target language produced by the translation unit on the source medium immediately laterally adjacent a line of the source language having the word or compound word of the source language to which the target language corresponds.

8. An electronic dictionary as in claim 1, wherein said translation unit is fixed to said optical reader and said printing means.

9. An electronic dictionary as in claim 1, wherein said optical reader and said printing means are separate from and movable with respect to said translation unit, and are electrically connected to said translation unit via a connector cord.

10. An electronic dictionary for electronic translation of words or compound words in a source language on a source medium into corresponding words or compound words in a target language, said electronic dictionary comprising:
- an optical reader having means for optically reading the source language to be translated by illuminating the medium with light from a light source external to the electronic dictionary and converting light reflected by the medium into electrical signals, said optical reader having a light collector for collecting light from the external source to be directed onto the medium, said light collector including a pair of plastic plates and fluorescent dye diffused between them, and a tip to which the light is guided and at which the light is radiated outside of said light collector;
- a translation unit which produces, on the basis of electrical signals, an output of target language corresponding to the source language read by the optical reader; and
- a display unit having a display panel for display on said display panel of the target language produced by said translation unit, said light collector being generally planar and transparent and being disposed over said display panel.

11. An electronic dictionary as in claim 10, further comprising means for redirecting the light from said tip of said light collector toward the medium.

12. An electronic dictionary as in claim 10, wherein said optical reader faces in a given direction for reading the source language to be translated from the source medium, the electronic dictionary further comprising a printer coupled to said translation unit, disposed adjacent to and fixed relative to said optical reader and facing in said given direction so as to facilitate printing of the target language produced by the translation unit on the source medium immediately laterally adjacent a line of the source language having the word or compound word of the source language to which the target language corresponds.

* * * * *